United States Patent [19]

Watts

[11] 4,265,417

[45] May 5, 1981

[54] HYDRAULIC NOSE LANDING GEAR STEERING ACTUATOR FOR AN AIRPLANE

[75] Inventor: John Watts, Bellevue, Wash.

[73] Assignee: The Boeing Company, Seattle, Wash.

[21] Appl. No.: 15,119

[22] Filed: Feb. 26, 1979

[51] Int. Cl.³ .............................................. B64C 25/50
[52] U.S. Cl. ........................................ 244/50; 92/122
[58] Field of Search ............................ 244/50, 100 R; 91/375 R, 376 A; 92/121, 122, 123, 124, 125

[56] References Cited

U.S. PATENT DOCUMENTS

| | | | |
|---|---|---|---|
| 2,550,180 | 4/1951 | Allen | 92/122 |
| 2,854,956 | 10/1958 | Hager | 244/50 |
| 3,052,912 | 9/1962 | Bishop | 244/100 R |
| 3,188,023 | 6/1965 | Dowty et al. | 244/50 |

Primary Examiner—Charles E. Frankfort
Attorney, Agent, or Firm—Christensen, O'Connor, Johnson & Kindness

[57] ABSTRACT

A hydraulic aircraft nose landing gear steering actuator includes a coaxial stator and rotor ring assembly mounted on the fixed outer cylinder of a nose landing gear shock absorber strut. Hydraulic vanes protruding radially inwardly and outwardly from the rotor and stator, respectively, form semi-annular pressure chambers between the stator and rotor rings which may be selectively hydraulically pressurized. A torsion link connects the steering actuator to the landing gear wheels. The steering actuator is capable of providing a constant steering torque to the landing wheels over a total steering displacement angle of approximately 150°.

5 Claims, 5 Drawing Figures

HYDRAULIC NOSE LANDING GEAR STEERING ACTUATOR FOR AN AIRPLANE

BACKGROUND OF THE INVENTION

This invention relates generally to aircraft nose landing gear assemblies, and, more particularly, to hydraulic steering actuators for aircraft nose landing gear assemblies.

Modern commercial aircraft require efficient nose landing gear steering actuators to provide steerage during taxiing of the aircraft. Various types of steering actuators have been employed for this purpose, yet certain undesirable features have characterized the steering actuators heretofore available.

For example, one type of steering actuator currently widely used on large commercial jet aircraft employs a pair of linear hydraulic push-pull actuators. Each push-pull actuator is fixed at one end with respect to the airplane frame and is connected at its other end to a radial extension of a rotatable landing gear shock absorber strut cylinder. The linear push-pull actuators are arranged approximately parallel to one another on opposite sides of the shock strut assembly. Steering of the nose wheel is effected by simultaneously pushing with one linear actuator and pulling with the other actuator. The system thus operates as a dual crank and crankshaft mechanism for translating the linear force of the actuators to rotational torque applied the landing gear shock strut. The disadvantage of this type of system is that torque is unevenly applied to the shock strut over its full range of rotation. As with any crankshaft mechanism for translating linear force to torsional force, the linear actuators are most efficient when the landing gear is at dead center and each actuator is at the top of its stroke. A sinusoidal relationship between the angular displacement of the landing gear and the torque applied by the actuators causes the actuators to become increasingly less efficient as they approach the bottom portions of their strokes and the landing gear is rotated away from dead center. Because of this inefficiency, the actuators must necessarily be designed to have excess power at the dead center position in order that they will have sufficient power to maintain the steering gear in a deflected position at high angles of rotation. As a result of this inefficiency and the design compensation necessary to overcome it, the steering actuators are relatively heavy and bulky. Furthermore, even when heavy-duty linear steering actuators are employed, they typically operate near their maximum power output when the landing gear is steered to a large steering angle. Because of the sinusoidal relationship between the torque applied to a crankshaft steering device and the angular displacement of the device, it follows that even heavy-duty linear steering actuators are capable of applying only a limited amount of torque at high displacement angles, and the rapid fall-off of torque at high angles can thereby cause poor control response and unpredictable steering performance.

Another type of steering actuator used in modern commercial aircraft is a rack and pinion steering assembly. Rack and pinion assemblies employ a system of involute gears and a hydraulically actuated rack to translate linear force from a hydraulic actuator to rotational torque applied to the landing gear shock strut. This type of assembly is complex, expensive and requires frequent adjustment of the gear system to control backlash and to avoid possible shimmy problems. Both rack and pinion and other types of gear-driven steering assemblies frequently suffer from such problems because virtually all of the steering load is transmitted through a single gear tooth. This problem is typically minimized, though not altogether avoided, by using large and heavy gears, an approach which is generally undesirable in resolving problems of aircraft mechanical components.

Accordingly, it is an object of the present invention to provide a nose landing gear steering actuator which does not employ any gear-driven mechanisms.

It is a further object of the present invention to provide a nose landing gear steering actuator which provides constant torque to the nose landing gear over its full range of angular displacement.

It is yet another object of the present invention to provide a nose landing gear steering actuator which can deflect the nose landing gear at least approximately 75° in either direction from a dead center position.

SUMMARY OF THE INVENTION

The present invention includes generally a hydraulic steering actuator which is mounted around the outer shock strut cylinder or other stationary portion of a landing gear strut. A stator ring is fixed to the outer cylinder of the shock strut and is encircled by a rotatable rotor ring. The rotor ring and stator ring each have one or more radially projecting vanes which space the rotor ring from the stator ring and form hydraulic pressure chambers between the stator and rotor rings which may be selectively pressurized for rotational movement of the rotor ring. The rotor vanes project inwardly to the outer cylindrical surface of the stator ring and the stator vanes project outwardly to the inner cylindrical surface of the rotor ring. In the preferred embodiment, upper and lower rotor plates seal the annular space between the respective upper edges and lower edges of the stator and rotor rings.

In the preferred embodiment, the stator vanes are positioned on opposite sides of the stator ring from one another. The rotor vanes are likewise positioned on opposite sides of the rotor ring from one another. When the steering actuator is in a dead center position corresponding to forward taxiing of the airplane, the rotor vanes are offset 90° from the stator vanes about the axis of rotation about the rotor ring. In this position, four semi-annular pressure chambers of approximately equal volume are formed between the stator and rotor rings. Each of these chambers is connected to the hydraulic system of the aircraft. To effect a rotational movement of the rotor ring, hydraulic fluid is pumped into two of the pressure chambers on opposite sides of the steering actuator from one another and is simultaneously exhausted from the two other pressure chambers. The difference in hydraulic pressure within the two sets of pressure chambers results in a net torque which tends to rotate the stator and rotor rings in opposite directions with respect to one another. Since the stator ring is fixed to the outer cylinder of the shock strut, this torque effectively causes the rotor ring to rotate about its axis.

Rotational torque is transmitted from the rotor ring to the landing wheel in the preferred embodiment by a torsion link. The torsion link is connected at its upper end to the rotor ring and is connected at its lower end to the inner cylinder or axle housing of the landing gear shock strut. The inner cylinder of the strut is journalled to allow free rotational movement of the inner cylinder and the nose landing wheel. The function of the torsion link is to transmit torque from the steering actuator to the landing wheel and the inner shock strut cylinder without impeding the linear shock-absorbing motion of the inner strut cylinder within the outer strut cylinder.

The rotor ring is free to rotate about the stator ring through an angle of approximately 75° in either direction from dead center. Because of the configuration of the semi-annular pressure chambers, the torque applied to the rotor ring by the pressure of the hydraulic fluid is constant over the full angular range of the rotor ring.

The steering actuator of the present invention thus provides a simple, highly reliable steering mechanism which contains no moving parts other than the rotor ring and its associated torsion link. Constant torque may be applied to the nose landing wheels throughout an angular steering range which is more than adequate for all normal taxiing operations.

DESCRIPTION OF THE PREFERRED EMBODIMENT

Figure 1:
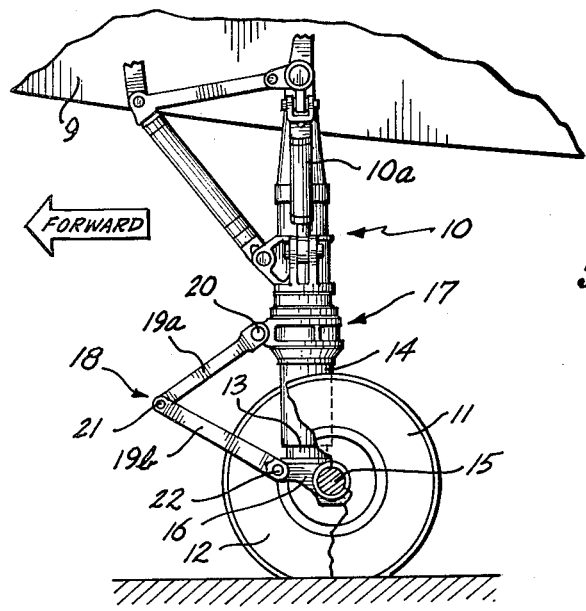
FIG. 1 is a side elevation view of the steering actuator of the present invention installed on the nose landing gear of a modern commercial jet airliner.

Referring to FIG. 1, a nose landing gear assembly is shown extended downwardly from an airplane fuselage 9. The landing gear assembly consists generally of a shock absorber strut 10 having landing wheels 11 and 12 journalled to its lower end. The strut 10 consists of telescoping inner and outer shock strut cylinders 13 and 14, respectively. The lower, inner strut cylinder 13 is freely rotatable within the outer cylinder 14 and is slidable axially within the outer cylinder 14 relative to the strut axis 10a. The axial displacement of the inner cylinder 13 is limited by a shock absorber assembly, not shown, located inside the strut 10. The wheels 11 and 12 are thus shock mounted and steerable relative to the airplane. The nose landing wheels 11 and 12 are freely rotatable about an axle 15 which extends transversely from an axle housing 16 secured to the lower end of the inner strut cylinder 13. The axis of the axle 15 is displaced rearwardly from the axis of the inner strut cylinder 13 by a few inches so that the wheels 11 and 12 trail the rest of the landing gear assembly and thereby stabilize the straight line trailing capability of the landing gear assembly.

The steering actuator 17 of the present invention is mounted on the outer shock strut cylinder 14. The actuator 17 produces torque about the axis 10a of the strut 10 which is transmitted to the inner strut cylinder 13 by a torsion link 18 to rotate the inner strut 13 about the strut axis 10a and thereby provide steering for landing wheels 11 and 12. The torsion link 18 connects the steering actuator 17 with the axle housing 16. The torsion link 18 consists of upper and lower torsion link arms 19a and 19b, respectively. Pivot pins 20, 21 and 22 are aligned parallel to one another and permit the torsion link arms 19a and 19b to flex in a vertical direction with respect to one another and with respect to the steering actuator 17 and the inner strut cylinder 13. The pivot pins 20, 21 and 22 do not permit the arms 19a and 19b to flex horizontally, thereby causing rotational torque generated by the actuator 17 about the strut axis to be effectively transmitted from the steering actuator 17 to the axle housing 16 and the inner strut cylinder 13 by means of the torsion link 18. At the same time, the torsion link 18 does not impede the inner strut cylinder 13 from sliding axially within the outer strut cylinder 14 to absorb shock.

Figure 2:
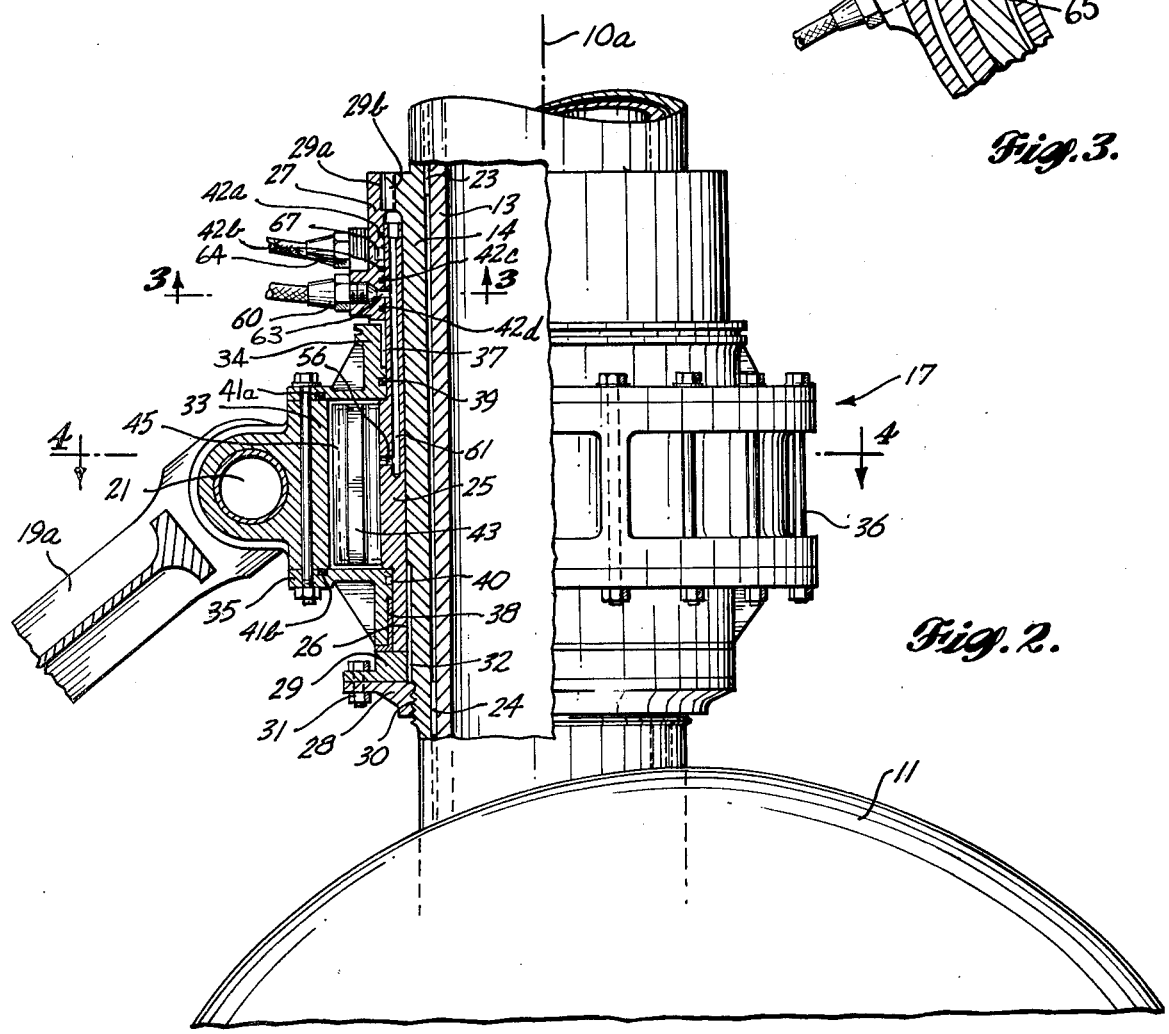
FIG. 2 is an enlarged side view in partial cross-section of the steering actuator of the present invention installed on the shock absorber cylinder strut of an aircraft nose landing gear.
Figure 4:
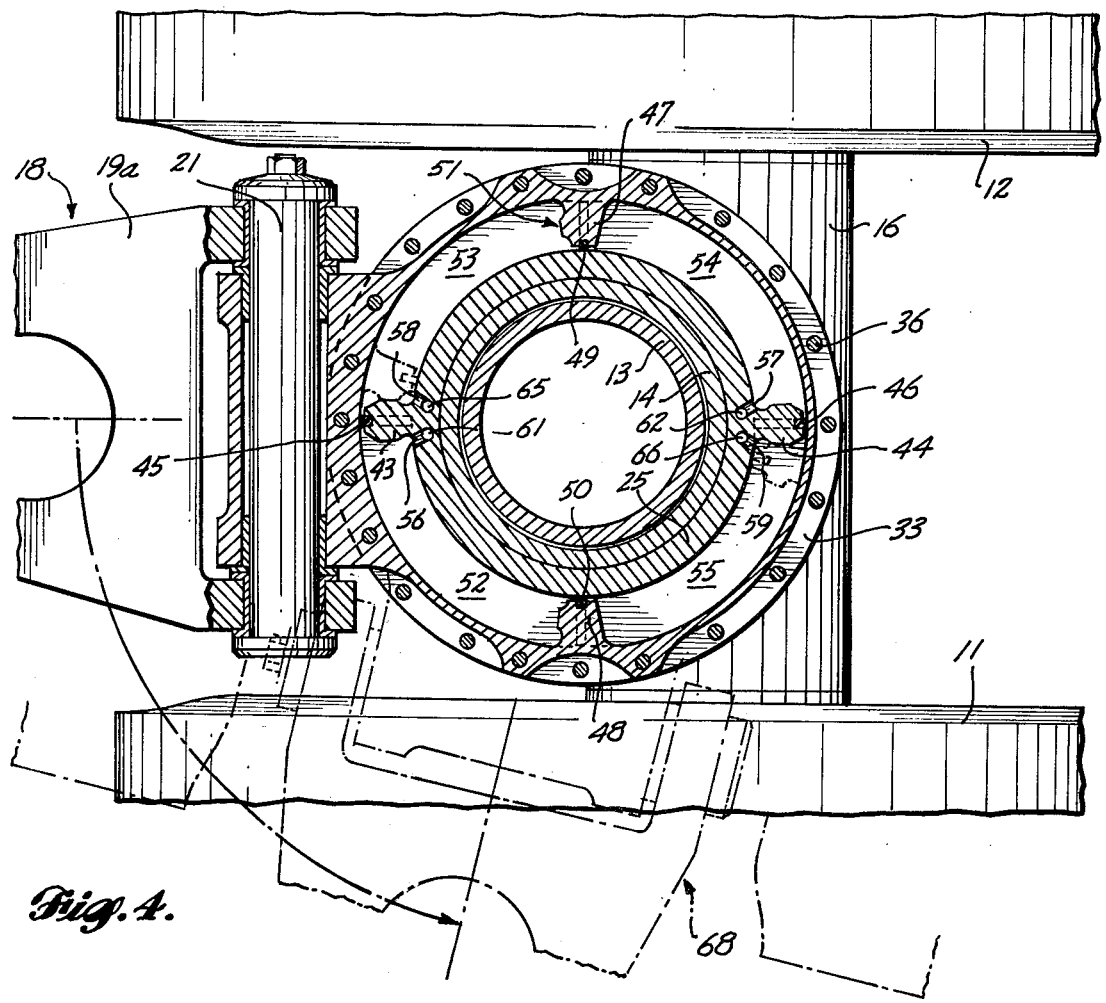
FIG. 4 is a cross-sectional view taken along line 4—4 of FIG. 2.

Referring to FIGS. 2 and 4, the inner strut cylinder 13 is spaced radially within the outer strut cylinder 14 by means of annular bronze bearings 23 and 24 which permit both axial and rotational movement of the inner cylinder 13 with respect to the outer cylinder 14. The shock absorber assembly (not shown) cushions impacts on the landing wheels 11 and 12 and limits the axial displacement of the inner strut cylinder 13 with respect to the outer strut cylinder 14.

Referring to FIG. 2, a stator ring 25 is secured to the outer surface of the outer strut cylinder 14. Mated splines 26 on the interior surface of the stator ring 25 and the exterior surface of the outer strut cylinder 14 prevent rotation of the stator ring 25 about the outer strut cylinder 14. The stator ring 14 is prevented from sliding axially along the outer strut cylinder 14 by a hydraulic manifold 27 at the upper end of stator ring 25 and by the combination of a ring nut 28 and an anti-torque ring 29 at the lower end of the stator ring 25. The manifold 27 is splined to the outer cylinder 14 by splines 29a and is prevented from sliding upwardly by an outwardly projecting flange 29b on the outer strut cylinder 14. The ring nut 28 is secured to the outer strut cylinder 14 by means of internal and external threads 30 respectively formed on the ring nut 28 and the outer cylinder 14, and is secured to the anti-torque ring 29 by means of a nut and bolt assembly 31. The anti-torque ring 29 is splined to the outer strut cylinder 14 by mated splines 32 on the inner surface of the anti-torque ring 29 and the outer cylinder 14.

A rotor ring 33 is coaxially positioned for rotational motion about the stator ring 25. The rotor ring 33 is secured to an upper rotor plate 34 and a lower rotor plate 35 by means of multiple nut and bolt assemblies 36 spaced around the circumference of the rotor ring 33. The rotor ring 33 is connected to the upper torsion link arm 19 by means of pivot pin 21.

Upper and lower rotor plates 34 and 35 rotate with the rotor ring 33 about outer cylinder 14 and ride on upper and lower flanged annular bronze bearings 37 and 38, respectively. The upper rotor plate 34 is spaced axially from the bottom of the hydraulic manifold 27 and radially from the stator ring 25 by the upper flanged annular bronze bearing 37. Likewise, the lower rotor plate 35 is axially spaced from the top of the anti-torque ring 29 and radially spaced from the stator ring 25 by the lower annular flanged bronze bearing 38. Rotary oil seals 39 and 40 are positioned in circular grooves in the interior surfaces of the rotor plates 34 and 35, respectively, to provide fluid-impermeable seals between the facing surfaces of each of the upper and lower rotor plates 34 and 35 and the stator ring 25. Conventional O-ring seals 41a and 41b are similarly employed between the facing surfaces of the upper and lower rotor plates 34 and 35, respectively, and the upper and lower edges of the rotor ring 33. Conventional O-ring seals 42a, 42b, 42c and 42d are also employed in circular grooves between the facing surfaces of the manifold 27 and the stator ring 25.

Referring to FIG. 4, the stator ring 25 has two stator vanes 43 and 44 which extend radially outwardly from the stator ring 25 to slidably abut the interior cylindrical surface of the rotor ring 33. Flexible C-shaped stator vane seals 45 and 46 are mounted in grooves around the peripheral edges of the vanes 43 and 44 to provide fluid-impermeable seals between the peripheral edges of the stator vanes 43 and 44, respectively, and the interior surfaces of the rotor ring 33 and the upper and lower rotor plates 34 and 35, respectively.

Likewise, rotor ring 33 has two rotor vanes 47 and 48 which extend radially inwardly to slidably abut against the outer cylindrical surface of the stator ring 25. The rotor vanes 47 and 48 have C-shaped rotor vane seals 49 and 50, respectively, inserted in peripheral grooves around the edges of the vanes 47 and 48 to provide fluid-impermeable seals between the rotor vanes 47 and 48 and the stator ring 25 and the lower and upper interior surfaces of the upper and lower rotor plates 34 and 35, respectively. Stator vanes 43 and 44 and rotor vanes 47 and 48 each have a stop face 51 which abuts against an adjacent vane to limit rotational displacement of the rotor ring 33.

Figure 3:
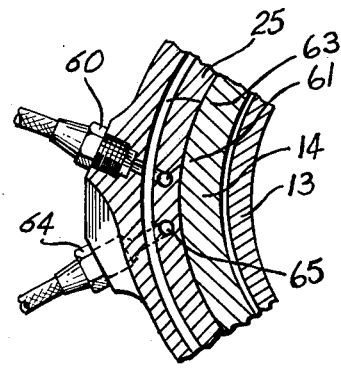
FIG. 3 is a cross-sectional view of a portion of the steering actuator taken along line 3—3 of FIG. 2.

Semi-annular hydraulic pressure chambers 52, 53, 54 and 55 are defined between the outer cylindrical surface of the stator ring 25 and the inner cylindrical surface of the rotor ring 33, and are separated from one another by the stator and rotor vanes 43, 44, 47 and 48. Hydraulic fluid may be either pumped into or exhausted from the pressure chambers by means of hydraulic fluid ports 56, 57, 58 and 59 located in the surface of the stator ring 25 immediately adjacent the opposite sides of the stator vanes 43 and 44. Fluid ports 56 and 57 are connected to one another and also to a system hydraulic port 60, shown in FIG. 3, by means of feed lines 61 and 62, respectively, which run vertically upward through the stator ring 25, and an annular hydraulic feed gallery 63 which runs circumferentially around the inside cylindrical surface of the hydraulic manifold 27 so as to connect the system hydraulic port 60 with each of the feed lines 61 and 62. Fluid ports 58 and 59 are likewise connected to one another and also to a second system hydraulic port 64 by means of feed lines 65 and 66, respectively, and a second annular feed gallery 67 shown in FIG. 2.

Operation of the steering actuator 17 is effected by pumping hydraulic fluid into one system hydraulic port 60 or 64 and simultaneously exhausting hydraulic fluid from the other system port 60 or 64. For example, hydraulic fluid may be pumped into system hydraulic port 60, wherefrom it flows through feed gallery 63 into feed lines 61 and 62, and thence through ports 56 and 57 into pressure chambers 52 and 54. Simultaneously, hydraulic fluid is exhausted from pressure chambers 53 and 55 by means of fluid ports 58 and 59, feed lines 65 and 66, feed gallery 67 and the second system hydraulic port 64. The higher hydraulic pressure in chambers 52 and 54 with respect to chambers 53 and 55 causes a net torque to be applied to the rotor ring 33 and torsion link 18 in a counterclockwise direction as viewed from above in FIG. 4, for example, to rotate the rotor ring 33 and torsion link 18 to a position shown by phantom outline 68 in FIG. 4. Torque is thus transmitted by means of the torsion link 18 to the inner strut cylinder 13 so as to cause the landing wheels 11 and 12 to be steered in a counterclockwise direction as viewed from above. It will be understood that the torque applied to the rotor ring 33 is constant throughout the entire angular displacement range of rotor ring 33. It will be apparent from FIG. 4 that rotor ring 33 is free to rotate in a counterclockwise direction until rotor vanes 47 and 48 abut against stator vanes 43 and 44, respectively. This angular displacement range corresponds to a rotational angle of approximately 75° from the dead center position.

By reversing the direction of fluid flow, the rotor ring 33 can be rotated in the opposite direction in a manner similar to that described above.

Because of the large steering angle and the constant torque which may be applied throughout that angle, the preferred embodiment of the steering actuator provides steering capabilities superior to those of the steering actuators heretofore available. Control response is uniform over the entire steering range. There is no fall-off of performance at high angles. The preferred embodiment offers improved reliability and low maintenance costs because of the mechanical simplicity of the system and the small number of moving parts.

Figure 5:
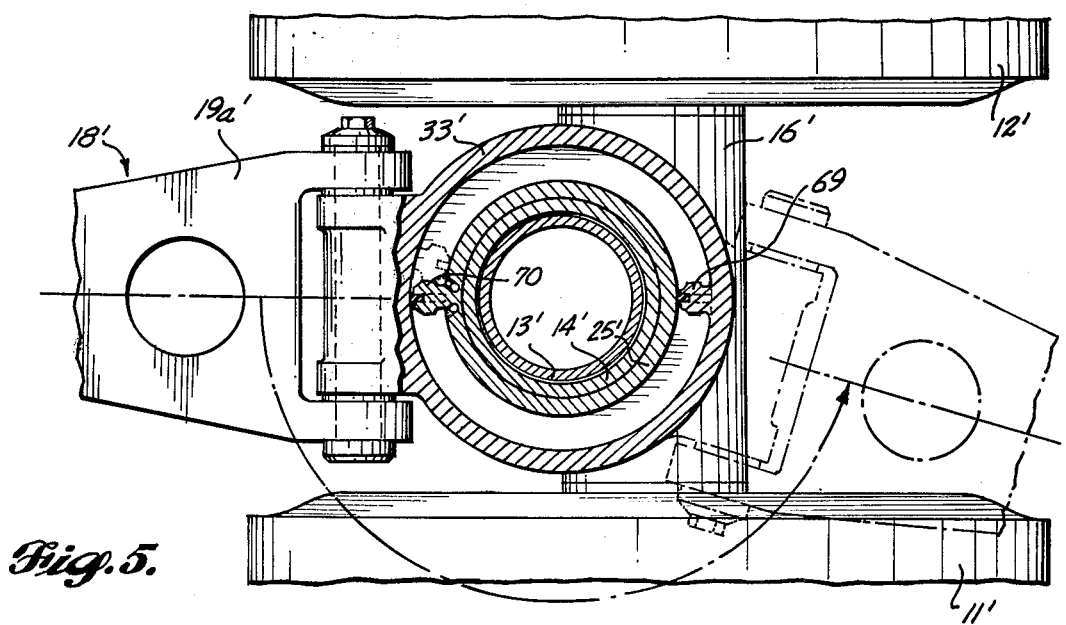
FIG. 5 is a cross-sectional view similar to FIG. 4 showing an alternative embodiment of the present invention.

Another embodiment of the invention is illustrated in FIG. 5, wherein major features also present in the preferred embodiment are designated with primed numerals corresponding with the numerals of FIGS. 1 through 4. In this embodiment a single rotor vane 69 and stator vane 70 are employed. This embodiment provides a considerably greater range of angular displacement, approximately 330° of rotation, than is possible with the preferred embodiment. However, because of the reduced pressure vane area, greater hydraulic fluid pressures are required to obtain the same steering torque as is achieved in the preferred embodiment. Also, since there are not the diametrically opposed pressure chambers of the preferred embodiment to exactly counterbalance radially directed shear stresses, the efficiency of this embodiment may be somewhat impaired by pressure-induced friction between the stator ring 25' and the rotor ring 33'.

Although specific embodiments of the invention are illustrated and described, it is understood that various modifications, alterations and variations of these embodiments may be made by one skilled in the art without departing from the spirit and scope of the invention, and that the scope of the invention is, accordingly, defined only by the following claims.

The embodiments of the invention in which an exclusive property or privilege is claimed are defined as follows:

1. In an aircraft nose landing gear assembly having a landing wheel journalled to a shock strut, said shock strut including telescoping inner and outer shock strut cylinders and shock absorber means contained therein, said outer shock strut cylinder being nonrotatable and said inner shock strut cylinder being rotatable about its longitudinal axis within said outer strut cylinder, said landing wheel being connected to the lower end of said inner shock strut cylinder, a steering actuator comprising:

a stator ring coaxially affixed about said outer shock strut cylinder and a rotor ring coaxially engaged about said stator ring for relative rotational motion, said stator ring having at least one stator vane projecting radially outwardly and said rotor ring having at least one rotor vane projecting radially inwardly, said rotor vane and said stator vane slidably abutting respectively said stator ring and said rotor ring, means sealably connecting said stator ring and said rotor ring to form pressure chambers separated by said vanes into which hydraulic fluid may be selectively pumped to rotate said rotor ring about said stator ring, said stator ring including an integral tubular extension portion having a cylindrical outer surface;

a tubular hydraulic manifold affixed about said outer shock strut cylinder adjacent said integral extension portion of said stator ring, said manifold including an annular portion having a cylindrical inner surface sized to snugly enclose said cylindrical outer surface of said extension portion of said stator ring in sealing relationship, said manifold including a pair of axially spaced hydraulic feed galleries recessed into and extending circumferentially about said cylindrical inner surface of said annular portion of said manifold, said stator ring further including internal hydraulic feed lines opening on said cylindrical outer surface of said extension portion of said stator ring in alignment with said feed galleries of said manifold and connecting said feed galleries in fluid communication with said pressure chambers, said manifold further including a pair of external hydraulic ports in communication with said feed galleries for connection to conventional hydraulic supply and return lines; and, flexible torsion link means operably connecting said rotor ring to said inner shock strut cylinder for transmitting steering torque from said rotor ring to said inner shock strut cylinder and landing wheel.

2. The steering actuator of claim 1 wherein said stator ring includes a pair of diametrically opposed stator vanes and said rotor ring includes a pair of diametrically opposed rotor vanes such that the actuator thereby includes four semiannular pressure chambers separated by said stator and rotor vanes, the diametrically opposed pairs of said pressure chambers being connected respectively to said pair of hydraulic feed galleries of said manifold by said internal feed lines in said stator ring.

3. The steering actuator defined in claim 3 wherein said stator ring and said manifold are each independently splined to said outer shock strut cylinder.

4. The steering actuator defined in claim 3 wherein said integral tubular extension portion of said stator ring extends upwardly such that said manifold may be affixed above the stator ring on the outer shock strut cylinder.

5. The steering actuator defined in claims 1 or 4 wherein said means sealably connecting said stator ring and said rotor ring comprises upper and lower annular rotor plates affixed to said rotor ring and sealably abutting said stator ring.

* * * * *